(12) United States Patent
Ertimo et al.

(10) Patent No.: US 12,520,309 B2
(45) Date of Patent: Jan. 6, 2026

(54) OPTIMIZATION OF A MOBILE NETWORK

(71) Applicant: Elisa Oyj, Helsinki (FI)

(72) Inventors: Riku Ertimo, Helsinki (FI); Veijo Höykinpuro, Helsinki (FI)

(73) Assignee: Elisa Oyj, Helsinki (FI)

( * ) Notice: Subject to any disclaimer, the term of this patent is extended or adjusted under 35 U.S.C. 154(b) by 0 days.

(21) Appl. No.: 19/105,362

(22) PCT Filed: Oct. 23, 2023

(86) PCT No.: PCT/FI2023/050598
§ 371 (c)(1),
(2) Date: Feb. 21, 2025

(87) PCT Pub. No.: WO2024/094921
PCT Pub. Date: May 10, 2024

(65) Prior Publication Data
US 2025/0267654 A1 Aug. 21, 2025

(30) Foreign Application Priority Data
Nov. 2, 2022 (FI) ...................................... 20225976

(51) Int. Cl.
H04W 72/1268 (2023.01)
H04W 72/52 (2023.01)

(52) U.S. Cl.
CPC ....... *H04W 72/1268* (2013.01); *H04W 72/52* (2023.01)

(58) Field of Classification Search
CPC .......................... H04W 72/1268; H04W 72/52
See application file for complete search history.

(56) References Cited

U.S. PATENT DOCUMENTS

2014/0295865 A1   10/2014   Fantaye et al.
2015/0282177 A1*  10/2015   Dong ................... H04L 67/145
                                                          370/329
(Continued)

FOREIGN PATENT DOCUMENTS

EP   3934358 A1   1/2022

OTHER PUBLICATIONS

Huawei, HiSilicon. 3GPP TSG RAN WG1 Meeting #110, Toulouse, France, Aug. 22-26, 2022, R1-2205878. Discussion on XR-specific capacity enhancements techniques.
(Continued)

*Primary Examiner* — Kevin M Cunningham
(74) *Attorney, Agent, or Firm* — Espatent Oy

(57) ABSTRACT

Optimization of a mobile network, performed by adjusting a proactive scheduling functionality in a target cell of the mobile network based on load in the target cell, wherein the proactive scheduling functionality is configured by a proactive scheduling parameter that defines a period of time over which an uplink connection is kept alive after sending the last bit of uplink data; responsive to the load in the target cell exceeding a first threshold, disabling the proactive scheduling functionality; responsive to the load in the target cell being below a second threshold, configuring the proactive scheduling parameter to a default value or gradually increasing the proactive scheduling parameter value; and responsive to the load in the target cell being between the first threshold and the second threshold, keeping the current proactive scheduling parameter value.

19 Claims, 3 Drawing Sheets

(56) References Cited

U.S. PATENT DOCUMENTS

| | | | |
|---|---|---|---|
| 2015/0304883 A1 | 10/2015 | Tabet et al. | |
| 2016/0044539 A1* | 2/2016 | Yiu | H04W 36/06 |
| | | | 370/235 |
| 2018/0070257 A1* | 3/2018 | Mochizuki | H04W 88/06 |
| 2020/0267744 A1 | 8/2020 | Mu et al. | |
| 2022/0225127 A1 | 7/2022 | Imran et al. | |
| 2022/0386175 A1* | 12/2022 | Panchal | H01Q 3/26 |

OTHER PUBLICATIONS

Overbeck, D. et al. Proactive Resource Management for Predictive 5G Uplink Slicing. Presentation in: 2022 IEEE Global Communications Conference (GLOBECOM).

Anonymous: NokiaEDU Capacity Management. LTE Optimization Principles [FL 16A]. Module 09. RA47059EN16AGLA0.

* cited by examiner

310. Obtain load information

320. Adjust proactive scheduling functionality based on the load information

> 321. If load > first threshold, disable the proactive scheduling functionality > 322. If load < second threshold, configure proactive scheduling parameter to a default value or gradually increase the proactive scheduling parameter value
>
>> 322a. If third threshold < load < second threshold, configure proactive scheduling parameter to a default value
>>
>> 322b. If load < third threshold, gradually increase the proactive scheduling parameter value > 323. If second threshold < load < first threshold, keep the current proactive scheduling parameter value 330. If mass event mode, disable the proactive scheduling functionality 340. Further adjust the proactive scheduling functionality based on information on applications used

Fig. 3

OPTIMIZATION OF A MOBILE NETWORK

TECHNICAL FIELD

The present application generally relates to optimization of a mobile network.

BACKGROUND

This section illustrates useful background information without admission of any technique described herein representative of the state of the art.

There is a continuous need to adjust and optimize operation of mobile networks in order to ensure quality of service in the mobile networks.

Present disclosure provides some new solutions for optimization of mobile networks.

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

According to a first example aspect there is provided a computer implemented method for optimization of a mobile network. The method is performed by adjusting a proactive scheduling functionality in a target cell of the mobile network based on load in the target cell, wherein the proactive scheduling functionality is configured by a proactive scheduling parameter that defines a period of time over which an uplink connection is kept alive after sending the last bit of uplink data;

responsive to the load in the target cell exceeding a first threshold, disabling the proactive scheduling functionality;

responsive to the load in the target cell being below a second threshold, configuring the proactive scheduling parameter to a default value or gradually increasing the proactive scheduling parameter value; and responsive to the load in the target cell being between the first threshold and the second threshold, keeping the current proactive scheduling parameter value.

In some example embodiments, the method further comprises: responsive to the load in the target cell being below a third threshold, gradually increasing the proactive scheduling parameter; and responsive to the load in the target cell being between the third threshold and the second threshold, configuring the proactive scheduling parameter to a default value.

In some example embodiments, gradually increasing the proactive scheduling parameter value comprises gradually increasing the proactive scheduling parameter value to a maximum value.

In some example embodiments, the first threshold is 30-50% of a reference load of the target cell and the second threshold is 15% of the reference load of the target cell.

In some example embodiments, the first threshold is 35% of a reference load of the target cell, the second threshold is 15% of the reference load of the target cell, the third threshold is 5% of the reference load of the target cell.

In some example embodiments, the default value is set to 20 ms.

In some example embodiments, the maximum value is set to 200 ms.

In some example embodiments, the method further comprises disabling the proactive scheduling functionality when the target cell is in a mass event mode.

In some example embodiments, the method further comprises setting the target cell in the mass event mode based on detecting that number of RRC connected users in the target cell exceeds a fourth threshold.

In some example embodiments, the method further comprises setting the target cell in the mass event mode based on a predefined schedule.

In some example embodiments, the method further comprises disabling the proactive scheduling functionality in one or more cells surrounding the target cell when the target cell is in the mass event mode.

In some example embodiments, the surrounding cells are selected based on number of handover attempts between the target cell and other cells.

In some example embodiments, the proactive scheduling functionality is further adjusted based on information on applications associated with the data connections in the target cell.

In some example embodiments, the method further comprises responsive to data connections in the target cell being associated with gaming applications, increasing the proactive scheduling parameter.

According to a second example aspect of the present invention, there is provided an apparatus comprising means for performing the method of the first aspect or any related embodiment. The means may comprise a processor and a memory including computer program code, and wherein the memory and the computer program code are configured to, with the processor, cause the performance of the apparatus.

According to a third example aspect of the present invention, there is provided a computer program comprising computer executable program code which when executed by a processor causes an apparatus to perform the method of the first aspect or any related embodiment.

According to a fourth example aspect there is provided a computer program product comprising a non-transitory computer readable medium having the computer program of the third example aspect stored thereon.

Any foregoing memory medium may comprise a digital data storage such as a data disc or diskette; optical storage; magnetic storage; holographic storage; opto-magnetic storage; phase-change memory; resistive random-access memory; magnetic random-access memory; solid-electrolyte memory; ferroelectric random-access memory; organic memory; or polymer memory. The memory medium may be formed into a device without other substantial functions than storing memory or it may be formed as part of a device with other functions, including but not limited to a memory of a computer; a chip set; and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which:

FIG. 3 shows a flow chart of methods according to example embodiments; and

DETAILED DESCRIPTION

In the following description, like reference signs denote like elements or steps.

3GPP specifications of mobile networks have defined a functionality called proactive scheduling which keeps the uplink connection established for a certain period of time after sending the last bit of uplink data. A proactive scheduling parameter sets duration for this period of time. The proactive scheduling parameter may be called ilReacTimerUI parameter, but various embodiments can be applied to any parameter having the same effect. The proactive scheduling functionality may be implemented by sending dummy grants to keep the uplink connection established. There may be different settings on how often the dummy grants are sent.

The purpose of the proactive scheduling functionality is to provide that during the defined time period the UE is able to respond faster with e.g. TCP ACK/NACK without needing to wait for (re) allocation of uplink resources. The downside is that surplus interference may be caused for the duration of the defined time period, which may reduce capacity.

Various tests performed by the inventors showed that there is no straightforward way to determine optimal value for the proactive scheduling parameter. It was noted that the value of the proactive scheduling parameter may have a negative impact on ping times, uplink quality, throughput and network load. Nevertheless, use of the proactive scheduling functionality may be clearly beneficial and should be allowed.

After tedious testing and analysis, the inventors of embodiments of the present disclosure came to the conclusion of adjusting the proactive scheduling functionality based on current load situation in the respective cell of the mobile network.

Figure 1:
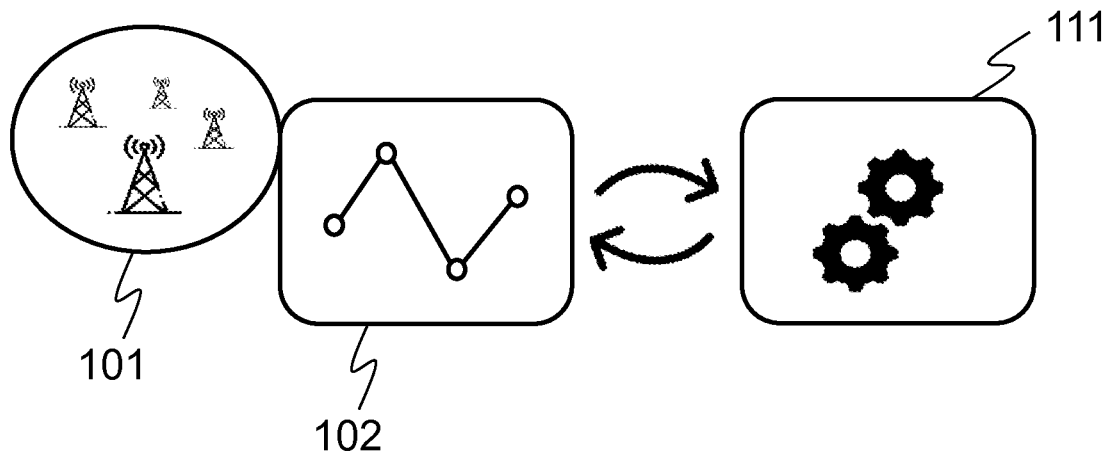
FIG. 1 schematically shows an example scenario according to an embodiment.

FIG. 1 schematically shows an example scenario according to an embodiment. The scenario shows a mobile network 101 comprising a plurality of cells and base stations and other network devices, and an operations support system, OSS, 102 configured to manage operations of the mobile network 101. Further, the scenario shows an automation system 111. The automation system 111 is operable to interact with the OSS 102 for example to receive data from the OSS 102 and to provide new settings to the mobile network 101 through the OSS 102.

The automation system 111 is configured to implement at least some example embodiments of present disclosure.

In an example embodiment the scenario of FIG. 1 operates as follows: The automation system 111 receives data from the mobile network 101 e.g. through the OSS 102. The data is automatically analysed in the automation system 111. Based on results of the analysis, the automation system 111 provides adjusts proactive scheduling parameter in one or more cells of the mobile network 101, if necessary.

Additionally, the results of the analysis may be stored for later use and/or shown on a display or otherwise output to a user. The analysis performed in the automation system 111 may be automatically or manually triggered. The analysis may be periodically repeated (e.g. once a day, every 1-14 days, once a week, every two weeks, once a month).

Figure 2:
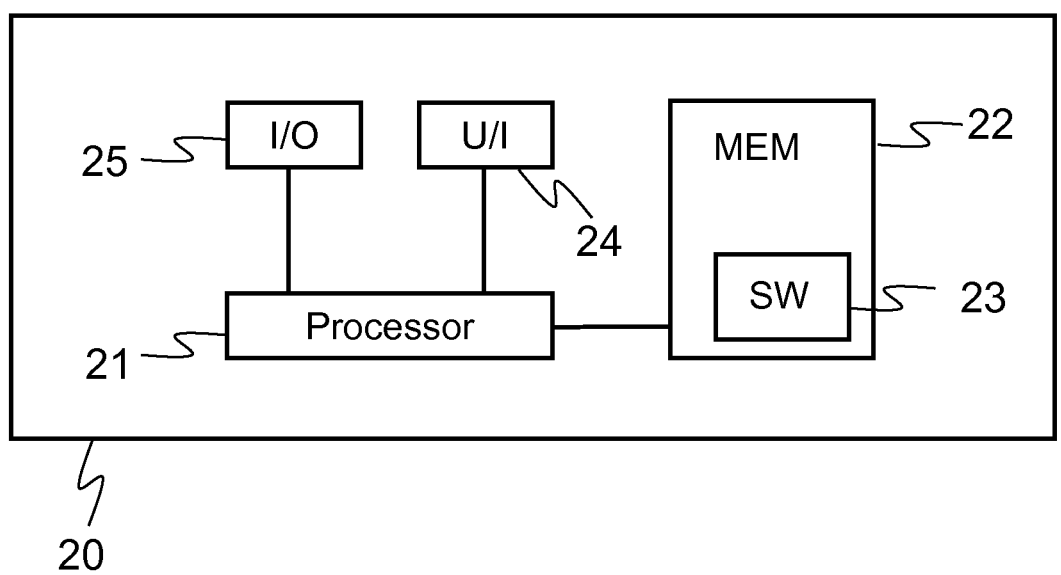
FIG. 2 shows a block diagram of an apparatus according to an example embodiment.

FIG. 2 shows a block diagram of an apparatus 20 according to an embodiment. The apparatus 20 is for example a general-purpose computer or server or some other electronic data processing apparatus or a cloud computing environment. The apparatus 20 can be used for implementing at least some embodiments of present disclosure. That is, with suitable configuration the apparatus 20 is suited for operating for example as the automation system 111 of FIG. 1.

The apparatus 20 comprises a communication interface 25; a processor 21; a user interface 24; and a memory 22. The apparatus 20 further comprises software 23 stored in the memory 22 and operable to be loaded into and executed in the processor 21. The software 23 may comprise one or more software modules and can be in the form of a computer program product.

The processor 21 may comprise a central processing unit (CPU), a microprocessor, a digital signal processor (DSP), a graphics processing unit, or the like. FIG. 2 shows one processor 21, but the apparatus 20 may comprise a plurality of processors.

The user interface 24 is configured for providing interaction with a user of the apparatus. Additionally or alternatively, the user interaction may be implemented through the communication interface 25. The user interface 24 may comprise a circuitry for receiving input from a user of the apparatus 20, e.g., via a keyboard, graphical user interface shown on the display of the apparatus 20, speech recognition circuitry, or an accessory device, such as a headset, and for providing output to the user via, e.g., a graphical user interface or a loudspeaker.

The memory 22 may comprise for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 20 may comprise a plurality of memories. The memory 22 may serve the sole purpose of storing data, or be constructed as a part of an apparatus 20 serving other purposes, such as processing data.

The communication interface 25 may comprise communication modules that implement data transmission to and from the apparatus 20. The communication modules may comprise a wireless or a wired interface module(s) or both. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as Ethernet or universal serial bus (USB), for example. The communication interface 25 may support one or more different communication technologies. The apparatus 20 may additionally or alternatively comprise more than one of the communication interfaces 25.

A skilled person appreciates that in addition to the elements shown in FIG. 2, the apparatus 20 may comprise other elements, such as displays, as well as additional circuitry such as memory chips, application-specific integrated circuits (ASIC), other processing circuitry for specific purposes and the like.

FIG. 3 shows a flow chart of methods according to example embodiments. The flow chart illustrates processes comprising various possible steps including some optional steps while also further steps can be included and/or some of the steps can be performed more than once. The processes may be implemented in the automation system 111 of FIG.

1 and/or in the apparatus 20 of FIG. 2. The processes are implemented in a computer program code and does not require human interaction unless otherwise expressly stated. It is to be noted that the processes may however provide output that may be further processed by humans and/or the processes may require user input to start.

The process of FIG. 3 comprises the following steps:

310: Information about load in cells of a mobile network is obtained from the mobile network either directly or through some intermediate system. The load that is taken into account may be for example maximum experienced load. The maximum experienced load may be the load during the busiest hour of the day. Additionally or alternatively, mean or median of daily or weekly maximum of experienced load may be used. For example, mean or median of the load during the busiest hour of the day over a 7-day period may be used.

The load may be expressed for example as a percentage of a reference load of the respective cell. The reference load may be a (theoretical) maximum load of the target cell.

320: A proactive scheduling functionality in a target cell of the mobile network is adjusted based on load in the target cell. Details of the adjustment according to some example embodiments are provided in steps 321, 322, 322a, 322b and 323. It is understood that details of all these steps are not necessarily needed for a fully functional solution.

321: The load information is compared to a first threshold and responsive to the load in the target cell exceeding a first threshold, the proactive scheduling functionality is disabled.

322: The load information is compared to a second threshold and responsive to the load in the target cell being below the second threshold, the proactive scheduling parameter is configured to a default value, or the proactive scheduling parameter value is gradually increased. Steps 322a and 322b provide further optional conditions for choosing whether to use the default value or to increase the value.

322a: The load information is further compared to a third threshold and responsive to the load in the target cell being between the third threshold and the second threshold, the proactive scheduling parameter is configured to the default value.

322b: Responsive to the load in the target cell being below the third threshold, the proactive scheduling parameter value is gradually increased.

323: Responsive to the load in the target cell being between the first threshold and the second threshold, the current proactive scheduling parameter value is kept unchanged.

330: If it is noted that the target cell is in a mass event mode the proactive scheduling functionality is disabled. In this way, one achieves a simple way to reduce the risk of degrading throughput when there are many users, whereby user experience is likely better.

In an embodiment, the target cell is set to the mass event mode based on detecting that the number of RRC connected users in the target cell exceeds a fourth threshold. The threshold may be for example 200 simultaneous users, but equally some other number of simultaneous users may be used. Additionally or alternatively, the target cell may be set to the mass event mode based on a predefined schedule. This may be used for example during events that gather a lot of people to certain area.

Further, in mass event mode, the proactive scheduling functionality may be disabled some surrounding cells (i.e. cells surrounding the target cell that is in the mass event mode). For example, three surrounding cells may be selected for this. The selected cells may be cells of same frequency. Additionally or alternatively, the surrounding cells may be selected based on number of handover attempts between the target cell and other cells. E.g. other cells with most handover attempts may be determined to be surrounding cells for this purpose.

340: The proactive scheduling functionality is further adjusted based on information on applications that are being used in the target cell. For example, if gaming applications are being used, the proactive scheduling parameter may be increased to a higher value that normally. In this way better latency may be achieved, which is important in gaming applications. Consequently, user experience may be improved.

Some further details of possible implementation examples are discussed in the following.

Disabling the proactive scheduling functionality may be implemented by setting the proactive scheduling parameter to 0 ms.

The default value of the proactive scheduling parameter may be 20 ms or some other suitable value.

The maximum value of the proactive scheduling parameter may be 200 ms, 2000 ms or some other suitable value.

Gradually increasing the proactive scheduling parameter value may comprise gradually increasing the proactive scheduling parameter value to a maximum value. The increase may be a linear increase or a stepwise increase.

The first threshold may be for example 30-50%, and preferably 35%, of a reference load of the target cell.

The second threshold may be for example 10-20%, and preferably 15%, of the reference load of the target cell.

The third threshold may be for example 3-8%, and preferably 5%, of the reference load of the target cell.

In an example embodiment, the first threshold is 35% of a reference load of the target cell, the second threshold is 15% of the reference load of the target cell, and the third threshold is 5% of the reference load of the target cell.

In an example embodiment, the first threshold is 35% of a reference load of the target cell, the second threshold is 10-20% of the reference load of the target cell, and the third threshold is 3-8% of the reference load of the target cell.

In an example embodiment, the first threshold is 30-50% of a reference load of the target cell, the second threshold is 15% of the reference load of the target cell, and the third threshold is 3-8% of the reference load of the target cell.

In an example embodiment, the first threshold is 30-50% of a reference load of the target cell, the second threshold is 10-20% of the reference load of the target cell, and the third threshold is 5% of the reference load of the target cell.

Figure 4:
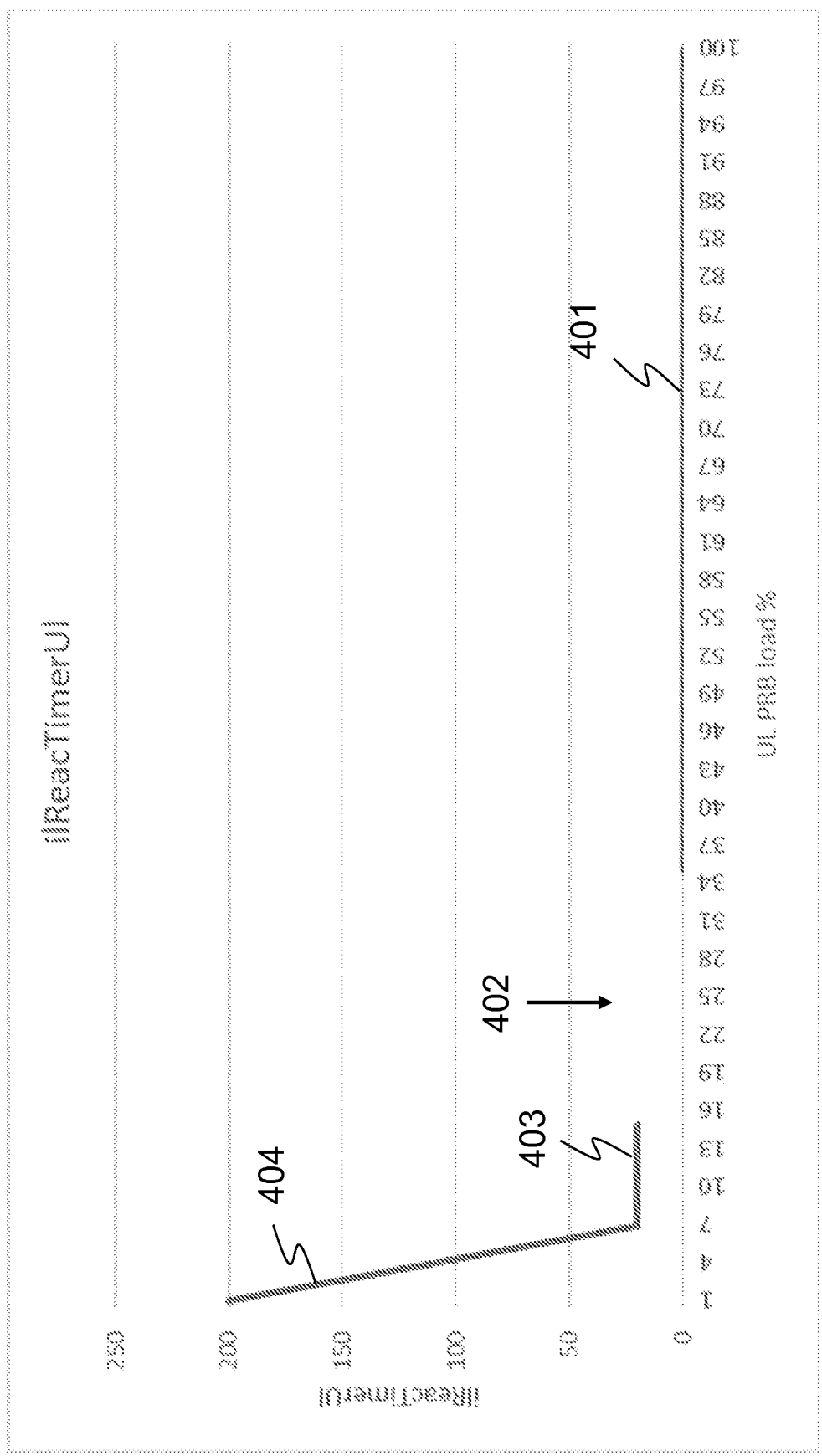
FIG. 4 shows a graph illustrating an example implementation.

FIG. 4 shows a graph illustrating an example implementation. The graph shows an ilReacTimerUI parameter in y-axis and uplink PRB load % in x-axis.

Line 401 shows that for load above 35%, the ilReacTimerUI is 0 ms.

Area 402, where load is between 15% and 35%, is a hysteresis area, where the ilReacTimerUI is not changed.

Line 403 shows that for load between 5% and 15%, the ilReacTimerUI is 20 ms.

Line 404 shows that for load below 5%, the ilReacTimerUI increases from 20 ms to 200 ms.

Without in any way limiting the scope, interpretation, or application of the claims appearing below, a technical effect of one or more of the example embodiments disclosed herein is improved use of proactive scheduling parameter. Various embodiments may help in reducing throughput by the use of the proactive scheduling parameter and thereby various embodiments may help in reducing the risk of degrading user experience.

A further technical effect is that throughput may be improved near cell edges at mid/high load situations, whilst lower latency may be maintained at lower load situations.

If desired, the different functions discussed herein may be performed in a different order and/or concurrently with each other. Furthermore, if desired, one or more of the before-described functions may be optional or may be combined Various embodiments have been presented. It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A computer implemented method for optimization of a mobile network, the method comprising
adjusting a proactive scheduling functionality in a target cell of the mobile network based on load in the target cell, wherein the proactive scheduling functionality is configured by a proactive scheduling parameter that defines a period of time over which an uplink connection is kept alive after sending the last bit of uplink data;
responsive to the load in the target cell exceeding a first threshold, disabling the proactive scheduling functionality;
responsive to the load in the target cell being below a second threshold, configuring the proactive scheduling parameter to a default value or gradually increasing the proactive scheduling parameter value;
responsive to the load in the target cell being between the first threshold and the second threshold, keeping the current proactive scheduling parameter value;
disabling the proactive scheduling functionality when the target cell is in a mass event mode; and
disabling the proactive scheduling functionality in one or more cells surrounding the target cell when the target cell is in the mass event mode,
wherein the surrounding cells are selected based on number of handover attempts between the target cell and other cells.

2. The method of claim 1, further comprising
responsive to the load in the target cell being below a third threshold, gradually increasing the proactive scheduling parameter; and
responsive to the load in the target cell being between the third threshold and the second threshold, configuring the proactive scheduling parameter to a default value.

3. The method of claim 1, wherein gradually increasing the proactive scheduling parameter value comprises gradually increasing the proactive scheduling parameter value to a maximum value.

4. The method of claim 1, wherein the first threshold is 30-50% of a reference load of the target cell and the second threshold is 15% of the reference load of the target cell.

5. The method of claim 2, wherein the first threshold is 35% of a reference load of the target cell, the second threshold is 15% of the reference load of the target cell, the third threshold is 5% of the reference load of the target cell.

6. The method of claim 2, wherein the default value is set to 20 ms.

7. The method of claim 3, wherein the maximum value is set to 200 ms.

8. The method of claim 1, further comprising setting the target cell in the mass event mode based on detecting that number of RRC connected users in the target cell exceeds a fourth threshold.

9. The method of claim 1, further comprising setting the target cell in the mass event mode based on a predefined schedule.

10. The method of claim 1, wherein the proactive scheduling functionality is further adjusted based on information on applications associated with the data connections in the target cell.

11. The method of claim 10, further comprising, responsive to data connections in the target cell being associated with gaming applications, increasing the proactive scheduling parameter.

12. An apparatus comprising means for performing the method of claim 1.

13. The apparatus of claim 12, wherein the means comprise a processor and a memory including computer program code, and wherein the memory and the computer program code are configured to, with the processor, cause the performance of the apparatus.

14. A non-transitory computer readable medium having a computer program comprising computer executable program code which when executed in an apparatus causes the apparatus to perform the method of claim 1.

15. A computer implemented method for optimization of a mobile network, the method comprising
adjusting a proactive scheduling functionality in a target cell of the mobile network based on load in the target cell, wherein the proactive scheduling functionality is configured by a proactive scheduling parameter that defines a period of time over which an uplink connection is kept alive after sending the last bit of uplink data;
responsive to the load in the target cell exceeding a first threshold, disabling the proactive scheduling functionality;
responsive to the load in the target cell being below a second threshold, configuring the proactive scheduling parameter to a default value or gradually increasing the proactive scheduling parameter value; and
responsive to the load in the target cell being between the first threshold and the second threshold, keeping the current proactive scheduling parameter value,
wherein the proactive scheduling functionality is further adjusted based on information on applications associated with the data connections in the target cell;
the method further comprising, responsive to data connections in the target cell being associated with gaming applications, increasing the proactive scheduling parameter.

16. An apparatus comprising a processor and a memory including computer program code, and wherein the memory and the computer program code are configured to, with the processor, cause the performance of the method of claim 15.

17. A non-transitory computer readable medium having a computer program comprising computer executable program code which when executed in an apparatus causes the apparatus to perform the method of claim 15.

18. The method of claim 15, further comprising disabling the proactive scheduling functionality when the target cell is in a mass event mode.

19. The method of claim 18, further comprising disabling the proactive scheduling functionality in one or more cells surrounding the target cell when the target cell is in the mass event mode.

* * * * *